(12) United States Patent
Suzuki (10) Patent No.: US 9,232,111 B2
(45) Date of Patent: Jan. 5, 2016

(54) IMAGE FORMING APPARATUS AND COMPUTER

(71) Applicant: Katsunori Suzuki, Shizuoka-ken (JP)

(72) Inventor: Katsunori Suzuki, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 111 days.

(21) Appl. No.: 13/671,849

(22) Filed: Nov. 8, 2012

(65) Prior Publication Data

US 2013/0155425 A1    Jun. 20, 2013

Related U.S. Application Data

(60) Provisional application No. 61/570,934, filed on Dec. 15, 2011.

(51) Int. Cl.
| | | |
|---|---|---|
| *H04N 1/40* | (2006.01) | |
| *H04N 1/50* | (2006.01) | |
| *H04N 1/60* | (2006.01) | |

(52) U.S. Cl.
CPC .............. *H04N 1/50* (2013.01); *H04N 1/6072* (2013.01)

(58) Field of Classification Search
CPC ... G06F 3/1204; G06F 3/1205; G06F 3/1253; G06F 3/1208; G06F 3/1219; G06F 3/1284; G06F 3/1258; G06F 17/211; G06F 17/212; G06F 3/1229; G06F 2206/1504; G06F 2206/1506; H04N 2201/0094; H04N 1/00482; H04N 1/00474; H04N 2201/0082; H04N 2201/33378; H04N 1/0044

USPC ........ 358/1.9, 2.1, 1.18, 453, 1.13, 1.15, 500, 358/400, 520; 382/165, 167, 180; 345/593
See application file for complete search history.

(56) References Cited

U.S. PATENT DOCUMENTS

| | | | | |
|---|---|---|---|---|
| 5,128,776 | A * | 7/1992 | Scorse et al. | 382/240 |
| 6,773,176 | B2 * | 8/2004 | Kurosawa | 400/76 |
| 7,239,412 | B2 * | 7/2007 | Leslie | 358/1.15 |
| 7,307,758 | B2 * | 12/2007 | Moro | 358/2.1 |
| 8,018,626 | B2 * | 9/2011 | Kiwada | 358/3.28 |
| 8,259,368 | B2 * | 9/2012 | Otake | 358/500 |
| 2010/0157063 | A1 * | 6/2010 | Basso et al. | 348/169 |

FOREIGN PATENT DOCUMENTS

| | | | | |
|---|---|---|---|---|
| JP | 11088612 | A * | 3/1999 | |
| JP | 2002-091743 | | 3/2002 | |
| JP | 2003-066778 | | 3/2003 | |
| JP | 2003125211 | A * | 4/2003 | |

* cited by examiner

*Primary Examiner* — Jerome Grant, II
*Assistant Examiner* — Stephen M Brinich
(74) *Attorney, Agent, or Firm* — Amin, Turocy & Watson, LLP (57) ABSTRACT

According to one embodiment, an image forming apparatus includes a display section, an input section, a control section, and an image forming section. The display section displays a printing target image as a preview. The input section receives designation of an area from a user on a preview image displayed by the display section. The control section distinguishes a region of the printing target image such that a part of a region in the designated area is one of color and monochrome and the other part of the region is the other of the color and the monochrome. The image forming section forms the printing target image on a sheet according to the distinction of the color and the monochrome by the control section.

7 Claims, 7 Drawing Sheets

← ORIGINAL IMAGE

FIG. 3B

| 11 | 12 | 13 | 14 | 15 | 16 | 17 | 18 | 19. |
|----|----|----|----|----|----|----|----|-----|
| 21 | 22 | 23 | 24 | 25 | 26 | 27 | 28 | 29. |
| 31 | 32 | 33 | 34 | 35 | 36 | 37 | 38 | 39. |
| 41 | 42 | 43 | 44 | 45 | 46 | 47 | 48 | 49. |
| 51 | 52 | 53 | 54 | 55 | 56 | 57 | 58 | 59. |
| 61 | 62 | 63 | 64 | 65 | 66 | 67 | 68 | 69. |
| 71 | 72 | 73 | 74 | 75 | 76 | 77 | 78 | 79. |
| 81 | 82 | 83 | 84 | 85 | 86 | 87 | 88 | 89. |
| 91 | 92 | 93 | 94 | 95 | 96 | 97 | 98 | 99. |
| a1 | a2 | a3 | a4 | a5 | a6 | a7 | a8 | a9. |
| b1 | b2 | b3 | b4 | b5 | b6 | b7 | b8 | b9 |
| c1 | c2 | c3 | c4 | c5 | ▓ | ▓ | ▓ | ▓ |
| d1 | d2 | d3 | d4 | d5 | ▓ | ▓ | ▓ | ▓ |

REGION DESIGNATED BY USER (DESIGNATION BY SQUARES)

FIG. 3C

REGION DESIGNATED BY USER (DESIGNATION BY SQUARES)

| 11 | 12 | 13 | 14 | 15 | 16 | 17 | 18 | 19. |
|----|----|----|----|----|----|----|----|-----|
| 21 | 22 | 23 | 24 | 25 | 26 | 27 | 28 | 29. |
| 31 | 32 | 33 | 34 | 35 | 36 | 37 | 38 | 39. |
| ▓ | ▓ | ▓ | ▓ | 45 | 46 | 47 | 48 | 49. |
| ▓ | ▓ | ▓ | ▓ | 55 | 56 | 57 | 58 | 59. |
| 61 | 62 | 63 | 64 | 65 | 66 | 67 | 68 | 69. |
| 71 | 72 | 73 | 74 | 75 | 76 | 77 | 78 | 79. |
| 81 | 82 | 83 | 84 | 85 | 86 | 87 | 88 | 89. |
| 91 | 92 | 93 | 94 | 95 | 96 | 97 | 98 | 99. |
| a1 | a2 | a3 | a4 | a5 | a6 | a7 | a8 | a9. |
| b1 | b2 | b3 | b4 | b5 | b6 | b7 | b8 | b9 |
| c1 | c2 | c3 | c4 | c5 | ▓ | ▓ | ▓ | ▓ |
| d1 | d2 | d3 | d4 | d5 | ▓ | ▓ | ▓ | ▓ |

REGION DESIGNATED BY USER (DESIGNATION BY SQUARES)

|  | AREA | CHARGE | AREA | CHARGE |
|---|---|---|---|---|
| MONOCHROME PRINTING | 0% | 10 YEN | – | – |
| COLOR PRINTING | 10% OR LOWER | 10 YEN | 20% OR LOWER | 15 YEN |
| COLOR PRINTING | 30% OR LOWER | 20 YEN | 40% OR LOWER | 25 YEN |
| COLOR PRINTING | 50% OR LOWER | 30 YEN | 60% OR LOWER | 35 YEN |
| COLOR PRINTING | 70% OR LOWER | 40 YEN | 80% OR LOWER | 45 YEN |
| COLOR PRINTING | 90% OR LOWER | 50 YEN | 100% | 50 YEN |

IMAGE FORMING APPARATUS AND COMPUTER

CROSS-REFERENCE TO RELATED APPLICATIONS

This application is based upon and claims the benefit of priority from: U.S. provisional application 61/570,934, filed on Dec. 15, 2011; the entire contents all of which are incorporated herein by reference.

FIELD

Embodiments described herein relate generally to a technique for setting color printing and monochrome printing.

BACKGROUND

In charging for printing, charges are sometimes different for two kinds of printing, i.e., color printing and monochrome printing. In this case, the charge for the color printing is higher than the charge for the monochrome printing because of toners and the like used in the printing.

If only a part of colors are included in an original document to be printed, a charge increases when charging for an entire page or an entire job is treated as charging in the color printing. Therefore, if only slight colors are included in one page, low color charging in which a charge between normal charges for the color printing and the monochrome printing is set is provided as a charge structure. In the low color charging, a pixel counter that calculates outputs of toners or inks of respective colors in an image forming apparatus indicates consumption equal to or smaller than a specified amount in one page, the low color charging is applied.

However, in this method, there is a problem in that a user does not see whether the color charging or the low color charging is applied.

DETAILED DESCRIPTION

In general, according to one embodiment, an image forming apparatus includes a display section, an input section, a control section, and an image forming section. The display section displays a printing target image as a preview. The input section receives designation of an area from a user on a preview image displayed by the display section. The control section distinguishes a region of the printing target image such that a part of a region in the designated area is one of color and monochrome and the other part of the region is the other of the color and the monochrome. The image forming section forms the printing target image on a sheet according to the distinction of the color and the monochrome by the control section.

The pixel counter of the image forming apparatus in the past can represent used areas of the respective colors as percentages to an area of one page in the color printing when a percentage of the area is set to 100%. Therefore, in usual specifications of the low color printing, a total of areas of the respective colors in the pixel counter is determined. For example, the specifications of the low color printing are set using the pixel counter.

If a color area ratio is 0%, it is determined that the monochrome printing is performed and 10 yen is charged.

If the color area ratio is lower than 10%, it is determined that the low color printing is performed and 20 yen is charged.

If the color area ratio is equal to or larger than 10%, it is determined that the color printing is performed and 50 yen is charged.

In this method, the image forming apparatus automatically selects a charge. Before printing, the user does not see which charging is applied.

The image forming apparatus according to this embodiment displays a printing preview, the user designates, on a preview image, an area that is printed in color, and charging corresponds to the size of the area. It is the user that designates a color area. Therefore, the user can grasp, before printing, the position and the range of the color area and how much the printing costs.

In this embodiment, there are a plurality of methods of selecting the color area by the user. For example, the methods are as explained below.

A printing target image and squares are superimposed on the printing preview and the user designates the squares.

The user can designate, as the color area, a specified pattern such as an upper part or a lower part, upper left or lower left, or upper right or lower right of the sheet. The user can change the size of the area of the specified pattern.

The user can designate the color area using a rectangle, a circle, or a figure drawn freehand and can enlarge or reduce the designated area.

The user can designate a plurality of the color areas.

The image forming apparatus according to this embodiment displays a charging amount corresponding to the area according to the enlargement or the reduction of the area. If layout printing (N in 1 printing) is designated, the color area is reduced according to the reduction by N in 1. An amount corresponding to the reduction is charged.

If the designated color area is equal to or larger than the specified area, display of a color or the like of a line for designating a range of an area can be changed. A plurality of areas can be automatically enlarged or reduced according to a predefined largest area.

A mode of this embodiment is explained below with reference to the accompanying drawings.

Figure 1:
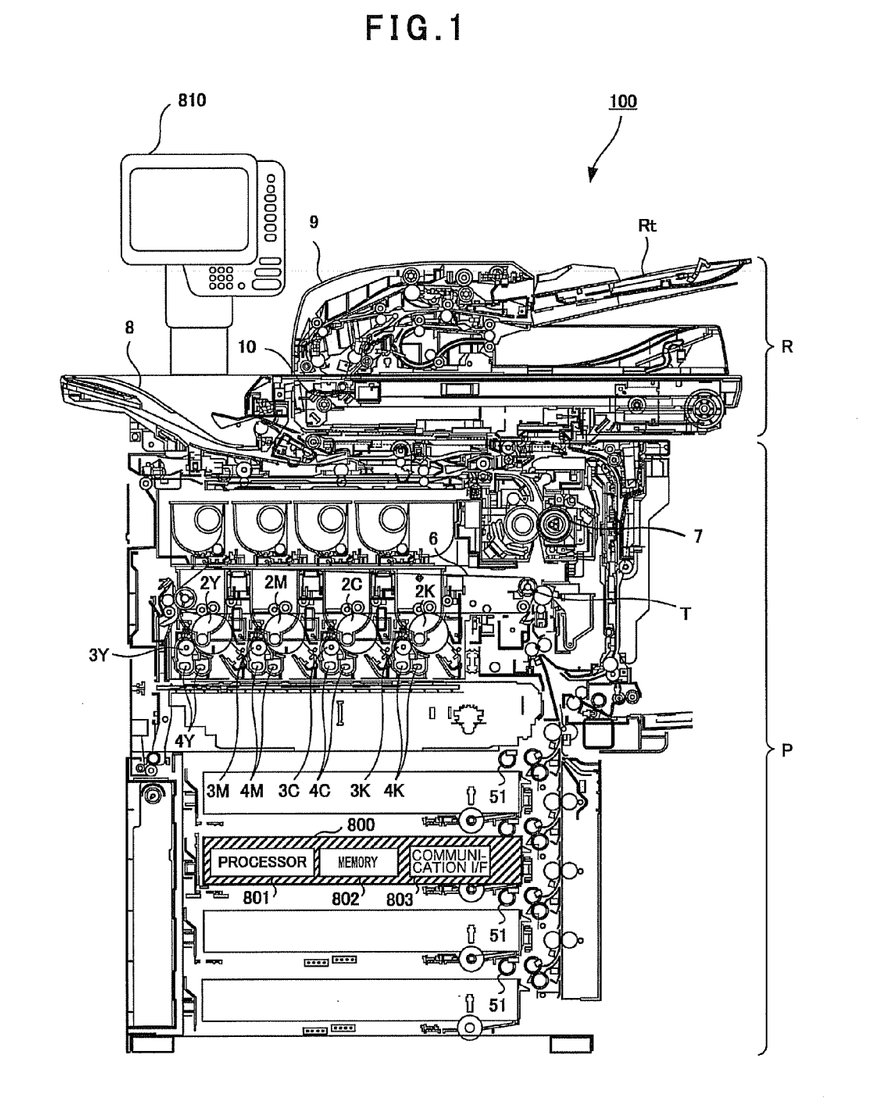
FIG. 1 is a diagram of a configuration example of an image forming apparatus.

FIG. 1 is a longitudinal sectional view of a schematic configuration of an image forming apparatus (MFP: Multi Function Peripheral) according to this embodiment. As shown in FIG. 1, an image forming apparatus 100 includes a reading section R and an image forming section P.

The reading section R has a function of scanning and reading images of a sheet document and a book document. The reading section R includes a scanning optical system 10 including a plurality of reflection mirrors and a plurality of image pickup elements. The reading section R further includes an auto document feeder (ADF) 9 that can automatically convey an original document to a predetermined placing place. An image of an original document placed on a document tray Rt and automatically conveyed by the auto document feeder 9 or an original document placed on a not-shown document table is read by the scanning optical system 10.

The image forming section P has a function of forming a developer image on a sheet on the basis of, for example, the image read from the original document by the reading section R or image data transmitted from an external apparatus to the image forming apparatus 100. The image forming section P includes photoconductive members 2Y to 2K, developing rollers 3Y to 3K, mixers 4Y to 4K, an intermediate transfer belt 6, a fixing device 7, and a discharge tray 8.

The image forming apparatus 100 includes a control board 800 (a control section) that collectively controls respective kinds of hardware in the apparatus. The control board 800 includes a processor 801, a memory 802, and, a communication I/F 803 (I/F: Interface). The processor 801 is an arithmetic processing unit such as a CPU (Central Processing Unit) or an MPU (Micro Processing Unit). The processor 801 has a role of performing various kinds of processing in the image forming apparatus 100. The processor 801 executes various functions by loading and executing computer programs stored in the memory 802 in advance.

The memory 802 is a storing unit including a RAM (Random Access Memory), which is a main storage device, or a nonvolatile storage device such as a flash memory or a hard disk drive. The communication I/F 803 is a unit that controls data transmission and reception to and from an external apparatus.

The image forming apparatus 100 includes a control panel 810. The control panel 810 includes an input section of a touch panel type that receives an instruction from a user and a display section of a flat type that displays processing contents, a message, and the like to the user and displays a preview image of a printing target image before printing.

As an example of processing in the image forming apparatus 100 according to this embodiment, an overview of copy processing is explained. First, sheets picked up by a pickup roller 51 are supplied into a sheet conveying path. The sheets supplied into the sheet conveying path are conveyed in a predetermined conveying direction by a plurality of roller pairs.

Images of a plurality of sheet documents continuously and automatically conveyed by the auto document feeder 9 are read by the scanning optical system 10.

Subsequently, the control board 800 applies predetermined image processing to image data read from the original document by the reading section R. Thereafter, electrostatic latent images of data after the image processing are formed on photoconductive surfaces of photoconductive members 2Y, 2M, 2C, and 2K for transferring developer images of Y (yellow), M (magenta), C (cyan), and K (black) onto the sheets.

Subsequently, developers agitated by mixers 4Y to 4K in developing devices are supplied to the photoconductive members 2Y to 2K, on which the electrostatic latent images are formed as explained above, by developing rollers (so-called mag rollers) 3Y to 3K. Consequently, the electrostatic latent images formed on the photoconductive surfaces of the photoconductive members are visualized.

Developer images formed on the photoconductive members in this way are transferred onto a belt surface of the intermediate transfer belt 6 (so-called primary transfer). The developer images conveyed according to the rotation of the intermediate transfer belt 6 are transferred onto the conveyed sheets in a predetermined secondary transfer position T.

The developer images transferred onto the sheets are heated and fixed on the sheets by the fixing device 7. The sheets having the developer images heated and fixed thereon are conveyed through the conveying path by the plurality of conveying roller pairs and sequentially discharged on to the discharge tray 8.

Print processing is the same as the operation explained above except that printing target data transmitted from a computer is acquired via the communication I/F 803.

Figure 2:
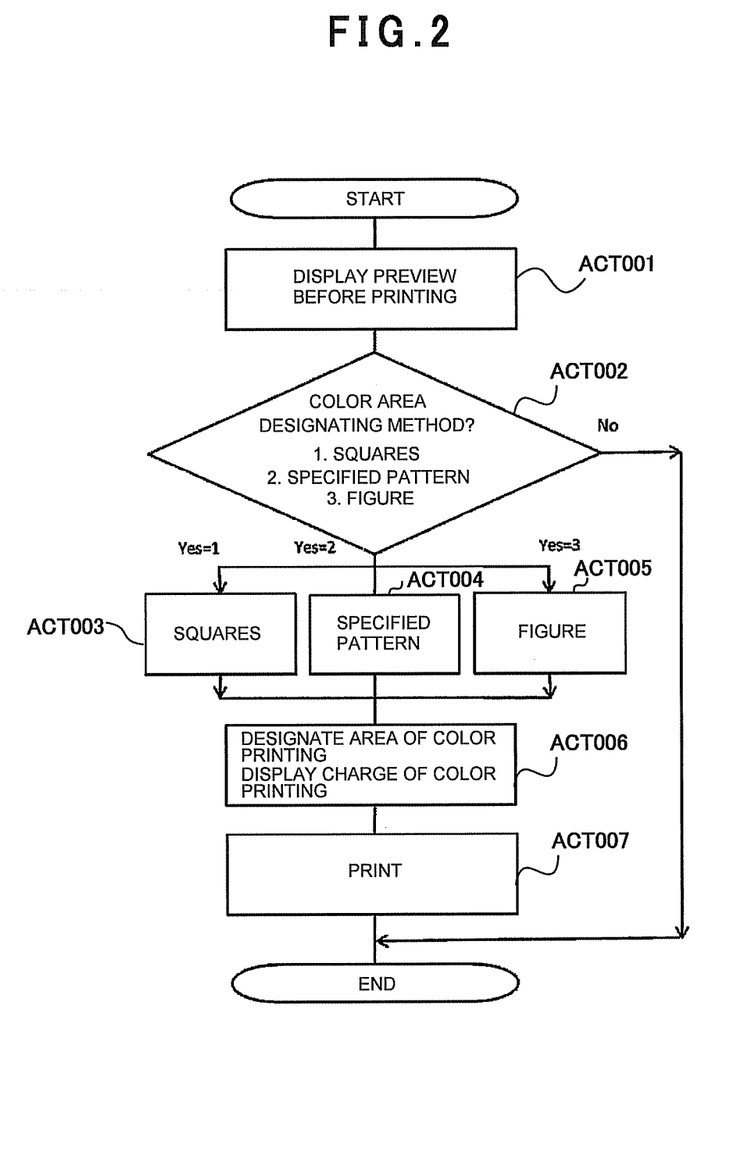
FIG. 2 is a flowchart for explaining an operation example of the image forming apparatus.

Before printing, the image forming apparatus 100 displays a preview image of a printing target image and causes the user to select an area that is printed in color. FIG. 2 is a flowchart for explaining an operation example of the image forming apparatus 100 at this point. The flowchart of FIG. 2 is realized by the processor 801 of the control board 800 executing an arithmetic operation of a computer program installed beforehand and stored in the memory 802. The flowchart is realized by the respective kinds of hardware operating according to an instruction of the processor 801.

Figure 3A:
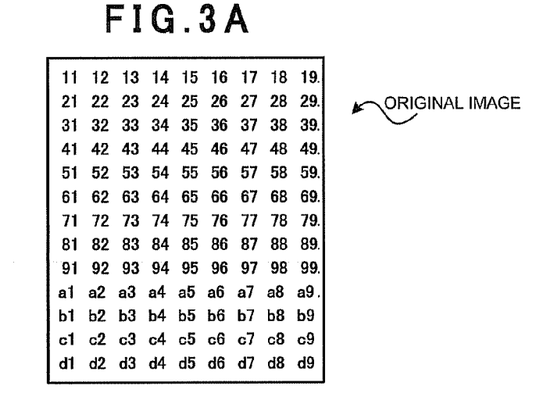
FIG. 3A is a diagram of an example of an original image displayed in printing preview.

After an original document is scanned or printing data is stored in the memory 802 via the communication I/F 803, the control panel 810 displays printing target image data as a preview (ACT 001). An example of a displayed preview image is shown in FIG. 3A. The image data is original image data.

The control panel 810 displays a dialog for causing the user to select a method of designating a color area and obtains information concerning the designating method from the user.

If the method of designating a color area is a method of designating a color area using squares (YES=1 in ACT 002), the control panel 810 displays longitudinal and lateral lines, which form the squares, to superimpose the lines on image data illustrated in FIG. 3A (ACT 003). The user touches, with a fingertip or the like, a screen displayed on the control panel 810 to designate an area of the squares (ACT 006). The control panel 810 detects the touch, acquires the position of the touch, and passes position information to the processor 801. The processor 801 controls the control panel 810 to display the squares including the position information in a gray color.

Figure 3B:
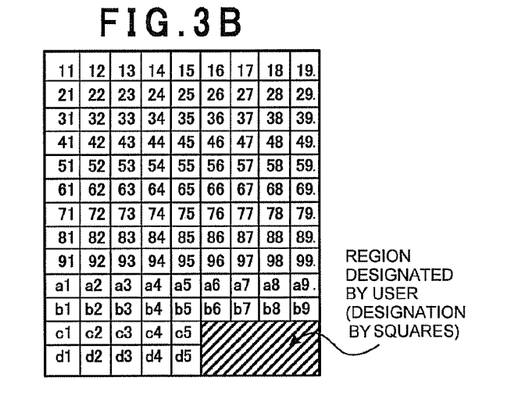
FIG. 3B is a diagram of an example in which a user designates a color area using squares.
Figure 3C:
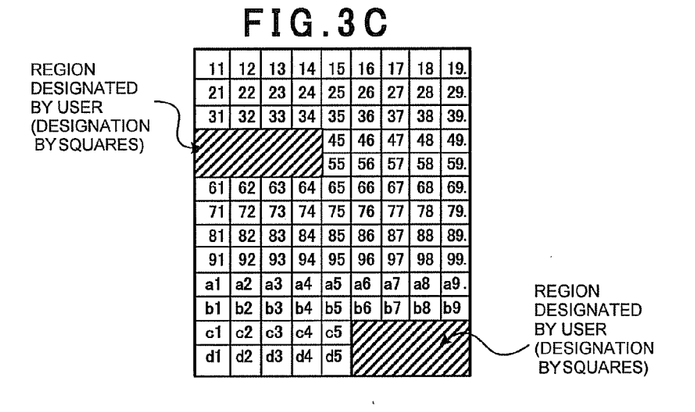
FIG. 3C is a diagram of an example in which the user designates color areas using squares.

States in which an area (s) is (are) designated by squares as explained above are shown in FIGS. 3B and 3C. FIG. 3B is a diagram of an example in which squares at the lower right end are selected and designated as a color area. FIG. 3C is a diagram of an example in which two areas are designated. As shown in FIG. 3C, the user can designate a plurality of areas. The user can designate only one square.

On the other hand, if a specified pattern is selected in ACT 002 (Yes=2 in ACT 002), the processor 801 acquires information concerning specified areas defined in advance such as an upper part or a lower part, upper left or lower left, and upper right or lower right from the memory 802 and instructs the control panel 810 to display a gray color in the areas to superimpose the gray color on the areas (ACT 004). The user designates which of the specified areas displayed on the control panel 810 is set as a color area (ACT 006). The user presses one area among the displayed specified areas long to release the area from being treated as the color area (the gray color is erased and only a rectangular frame is displayed). If the user further presses the rectangular frame long in a state in which the area is released from being treated as the color area, the area is treated as the color area again.

A region can be enlarged or reduced in each of the specified areas according to the fingertip operation (pinch operation) of the user. It is possible to apply the designation by the squares to the designation of the specified pattern. It is possible to display longitudinal and lateral lines, which form the squares, and cause the user to designate the release of the color area and the return to the color area in a square unit.

On the other hand, if a figure is selected in ACT 002 (Yes=3 in ACT 002), the control panel 810 displays a predetermined dialog for causing the user to select a circular shape, a rectangular shape, or a figure drawn freehand and guides the user in selecting any one of the shapes. The processor 801 instructs the control panel 810 to display the shape selected by the user via the dialog. The control panel 810 displays the designated shape in a size determined beforehand and in a position determined beforehand (ACT 005). The user touches and operates the shape to be displayed to designate an area to be displayed in color (ACT 006). The shape indicating the color area in this way can be moved by drag operation by the user and can be enlarged and reduced by the pinch operation.

Figure 4A:
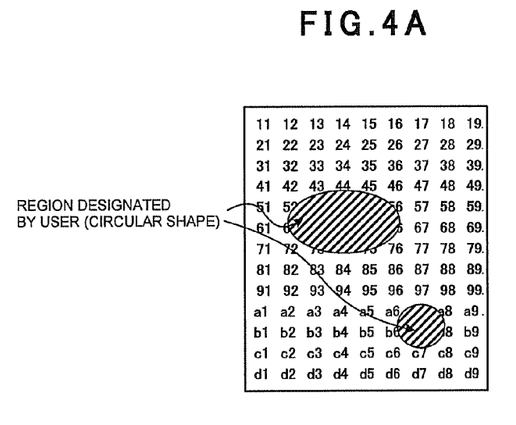
FIG. 4A is a diagram of an example in which the user designates color areas using circular shapes.
Figure 4B:
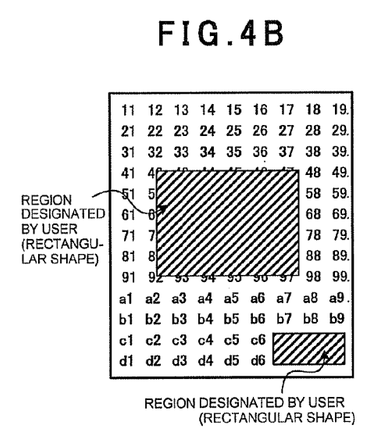
FIG. 4B is a diagram of an example in which the user designates color areas using rectangular shapes.
Figure 4C:
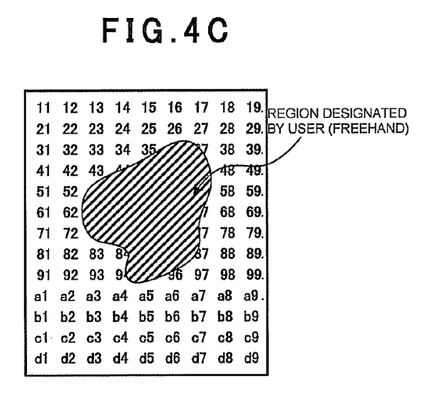
FIG. 4C is a diagram of an example in which the user designates a color area freehand.

FIG. 4A is a diagram of a state in which a plurality of color areas are designated in circular shapes by the user. FIG. 4B is a diagram of a state in which color areas are designated in rectangular shapes. FIG. 4C is a diagram of a state in which a color area is designated freehand. When the color area is designated freehand, the control panel 810 detects a fingertip position of the user and the processor 801 acquires a track coordinate of the fingertip and instructs the control panel 810 to render a figure, whereby an area is designated. The shape of a closed region is formed by connecting a start point and an end point of the freehand. These shapes can be moved by the drag operation and the color areas can be enlarged and reduced by the pinch operation.

In ACT 006, the processor 801 distinguishes the area designated by the user and the other area by displaying the former in color and displaying the latter in monochrome. For example, the processor 801 distinguishes the color area and the monochrome area by storing only a coordinate value in the squares or the figure area designated by the user in the memory 802 and not storing the other coordinate values. Implementation is also possible in which a flag map associated with pixel positions of a printing target image is provided in the memory 802 (e.g., 0 is treated as monochrome and 1 is treated as color) and the processor 801 changes a flag from 0 to 1 in a region designated as a color area. Besides, there are various distinguishing methods.

Figure 5:
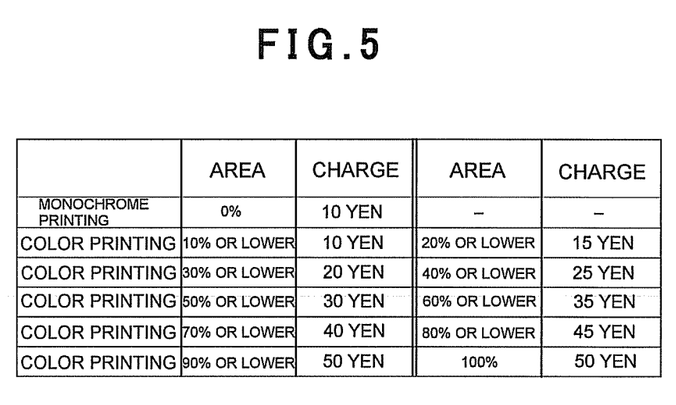
FIG. 5 is a diagram of an example of a correspondence table between ratios of color areas and charges stored in a storing section.

In ACT 006, the processor 801 determines a charging amount according to the designation of the color area by the user (ACT 006). In the memory 802, ratios of color areas to an entire area (in a page unit or a job unit) and charging amounts for the ratios are stored in association with each other beforehand as illustrated in FIG. 5. The processor 801 calculates an area ratio of the color area using the number of squares designated by the user in the case of the area designation by squares or using the number of pixels in the area designated in color in the case of the area designation by the specified pattern or the figure. The processor 801 derives a charging amount from the area ratio of the color area using the correspondence table shown in FIG. 5 and causes the control panel 810 to display the amount. In all of the square designation, the specified pattern designation, and the figure designation, the charging amount is determined according to the size of the color area.

Figure 6A:
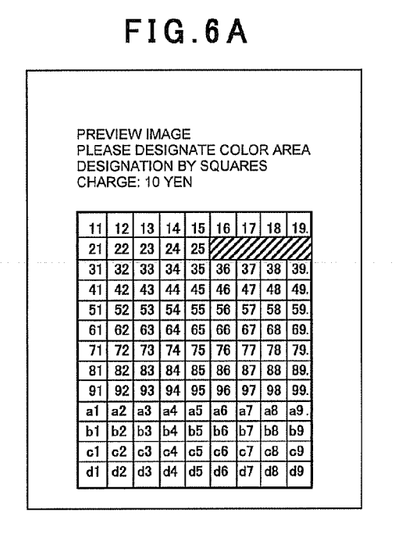
FIG. 6A is a diagram of a display example of the printing preview.
Figure 6B:
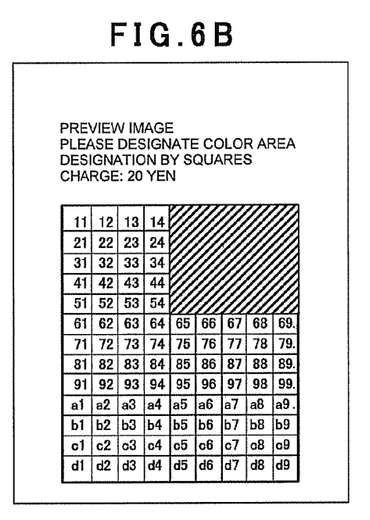
FIG. 6B is a diagram of another display example of the printing preview.
Figure 6C:
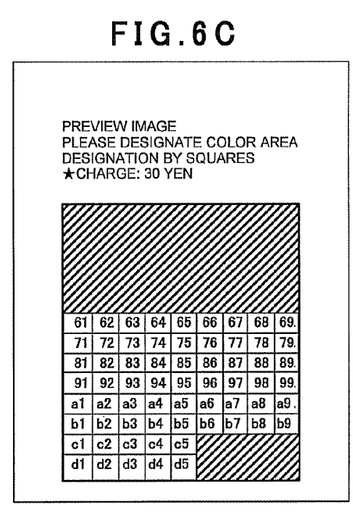
FIG. 6C is a diagram of a display example of the printing preview displayed when a charge exceeds a set charge.

Examples of preview screens displayed on the control panel 810 are shown in FIGS. 6A to 6C. FIGS. 6A to 6C are diagrams of examples in which a color area is selected by the square designation. In the example shown in FIG. 6A, the color area is equal to or smaller than 10% of the entire area (in this case, one page). Therefore, the charging amount is 10 yen according to the correspondence table shown in FIG. 5. In the example shown in FIG. 6B, the color area is larger than 20% and equal to or smaller than 30% of the entire area. Therefore, the charging amount is 20 yen. In the example shown in FIG. 6C, the color area is larger than 40% and equal to or smaller than 50% of the entire area. Therefore, the charging amount is 30 yen. Every time the user changes the size of the area, this amount display is changed following the change of the size.

In this embodiment, a threshold can be provided for the size of the color area beforehand. If the size of the color area exceeds the threshold, a mark indicating this effect is displayed to the user. FIG. 6C is a display example of the mark displayed when the size of the color area exceeds the threshold. Since the size of the color area exceeds the threshold, a star shape mark is attached to a display region of the charging amount. The threshold may be the size (the ratio) of the area or may be the charging amount. The user can determine the threshold.

If the position and the size of the color area and the charging amount are decided by the action in ACT 006 and a predetermined start button is pressed, the image forming section P forms, according to the color and the monochrome distinguished by the control board 800, an image on a sheet in color in the area designated by the user and in monochrome in the other area (ACT 007). A charging counter (the memory 802 can be used as the charging counter) that accumulates and stores the charging amount is counted up by the amount decided by the action in Act 006 and the charging amount is stored in the memory 802.

Figure 7:
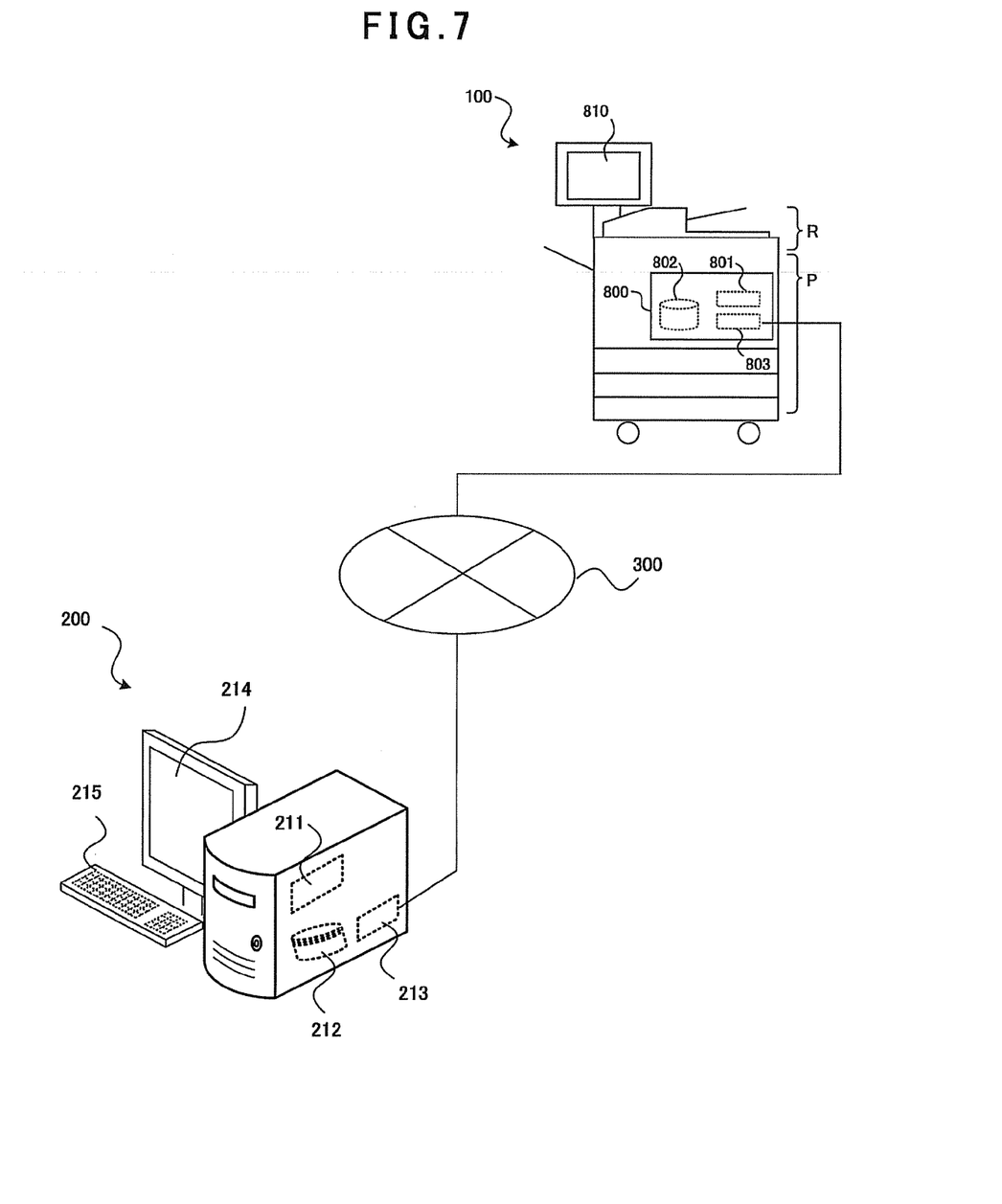
FIG. 7 is a diagram of a configuration example of a printing system.

The mode in which the color area is designated using the control panel 810 of the image forming apparatus 100 is explained above. However, concerning the print processing, a mode in which the color area is designated by a computer, which is a transmission source of printing data, may be adopted. FIG. 7 is a schematic diagram of an example of a printing system in which the image forming apparatus 100 and a computer 200 are connected via a network 300. The computer 200 includes a processor 211, a memory 212, and a communication I/F 213 having functions same as those in the image forming apparatus 100. The computer 200 further includes a monitor 214, which is a display section, and a keyboard 215, which is an input section. A mouse may be further provided as the input section.

A printer driver program, which is invoked when printing data is transmitted to the image forming apparatus 100, is installed in the memory 212 in advance. When printing is executed, the processor 211 reads out and executes the driver program. The processor 211 controls the memory 212, the monitor 214, the keyboard 215, the mouse, and the like according to a code of the driver program to perform the actions in ACT 001 to ACT 006 in FIG. 2. The correspondence table shown in FIG. 5 is stored in the memory 212 of the computer 200. Implementation in which the correspondence table is stored in the memory 802 of the image forming apparatus 100 may be adopted. In this case, data is transmitted to the computer 200 according to necessity.

When the color area and the like are decided in ACT 006, the processor 211 creates printing data according to the decided color area and the decided monochrome area and transmits the printing data to the image forming apparatus 100 via the communication I/F 213. The image forming apparatus 100 forms an image on the sheet using the transmitted printing data (ACT 007).

In the example explained above, the user designates the color area using the figure or the squares. However, implementation for designating a monochrome area may be adopted. In this case, a region other than the designated area is a color area. In the example, the figure of the area is the rectangular shape, the circular shape, or the shape drawn freehand. However, the figure may be any figure.

In the explanation of this embodiment, the function for carrying out the invention is recorded in advance on the inside of the apparatus. However, the present invention is not limited to this. The same function may be downloaded to the apparatus from a network or the same function stored in a recording medium may be installed in the apparatus. A form of the recording medium may be any form as long as the recording medium is a recording medium such as a CD-ROM that can store a program and is readable by the apparatus. The function obtained by the installation or the download in advance in this way may be realized in cooperation with an OS (operating system) or the like provided on the inside of the apparatus.

As explained above in detail, with the technique described in this specification, the user can grasp which part of printing target image data is color or monochrome.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the sprit of the inventions. The accompanying claims and their equivalents are intended to cover such forms or modifications as would fall within the scope and spirit of the inventions.

What is claimed is:

1. An image forming apparatus comprising:
a display section configured to display a printing target image as a preview;
an input section configured to receive designation of an area from a user on a preview image displayed by the display section;
a control section configured to distinguish a region of the printing target image such that a part of a region in the designated area is one of color and monochrome and the other part of the region is the other of the color and the monochrome; and
an image forming section configured to form the printing target image on a sheet according to the distinction of the color and the monochrome by the control section, wherein
the control section further determines a charging amount according to a size of the area designated by the user, and
the display section displays the determined charging amount on a same screen where the printing target image is displayed as a preview.

2. The apparatus according to claim 1, wherein
a plurality of the areas are designated by the user, and
the display section displays the areas to superimpose the areas on the preview image.

3. The apparatus according to claim 1, wherein
the control section compares a threshold defined beforehand and a size of the area or the charging amount, and
if the size or the charging amount exceeds the threshold, the display section displays a predetermined mark.

4. A computer comprising:
a display section configured to display a printing target image as a preview;
an input section configured to receive designation of an area from a user on a preview image displayed by the display section; and
a control section configured to distinguish a region of the printing target image such that a part of a region in the designated area is one of color and monochrome and the other part of the region is the other of the color and the monochrome, wherein
the control section further determines a charging amount according to a size of the area designated by the user, and
the display section displays the determined charging amount on a same screen where the printing target image is displayed as a preview.

5. A method of forming an image, comprising:
displaying a printing target image as a preview image on a display section;
designating an area of the displayed preview image;
distinguishing a region of the designated area such that a part of such region is one of color and monochrome and another part of such region is one of other color and monochrome; and
forming the image on a sheet according to the distinguished region,
wherein a charging amount is determined according to a size of the designated area(s), and
the determined charging amount is displayed at the display section on a same screen where the printing target image is displayed as a preview.

6. The method according to claim 5, wherein
a plurality of the areas are designated by the user on the display section, and
the designated areas for forming are superimposed on the displayed preview image.

7. The apparatus according to claim 5, wherein
comparing a predefined threshold to a size of the area or the charging amount, and
displaying a predetermined mark at the display section if the size of the area or the charging amount exceeds such predefined threshold.

* * * * *